(12) United States Patent
Bartko et al.

(10) Patent No.: US 8,800,652 B2
(45) Date of Patent: *Aug. 12, 2014

(54) METHOD FOR REAL-TIME MONITORING AND TRANSMITTING HYDRAULIC FRACTURE SEISMIC EVENTS TO SURFACE USING THE PILOT HOLE OF THE TREATMENT WELL AS THE MONITORING WELL

(75) Inventors: Kirk M. Bartko, Dhahran (SA); Brett Wayne Bouldin, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 391 days.

This patent is subject to a terminal disclaimer.

(21) Appl. No.: 13/269,596

(22) Filed: Oct. 9, 2011

(65) Prior Publication Data

US 2013/0087325 A1  Apr. 11, 2013

(51) Int. Cl.
    *E21B 47/00*   (2012.01)
(52) U.S. Cl.
    USPC ..................... 166/250.1; 166/308.1
(58) Field of Classification Search
    USPC ........................... 166/250.1, 308.1
    See application file for complete search history.

(56) References Cited

U.S. PATENT DOCUMENTS

| | | | |
|---|---|---|---|
| 4,264,862 A | 4/1981 | Koelle et al. | |
| 5,963,508 A | 10/1999 | Withers | |
| 6,065,538 A | 5/2000 | Reimers et al. | |
| 6,281,489 B1 | 8/2001 | Tubel | |
| 6,896,074 B2 | 5/2005 | Cook et al. | |
| 7,202,671 B2 | 4/2007 | Strack et al. | |
| 7,272,503 B2 | 9/2007 | Strack et al. | |
| 7,543,635 B2 * | 6/2009 | East et al. | 166/250.17 |
| 8,096,355 B2 * | 1/2012 | McDaniel et al. | 166/250.1 |
| 2002/0125008 A1 | 9/2002 | Wetzel | |
| 2004/0069487 A1 | 4/2004 | Cook et al. | |
| 2006/0028208 A1 | 2/2006 | Strack | |
| 2007/0168134 A1 | 7/2007 | Strack | |
| 2007/0215345 A1 | 9/2007 | Lafferty et al. | |
| 2009/0151950 A1 | 6/2009 | Patel | |
| 2009/0288820 A1 | 11/2009 | Barron et al. | |
| 2011/0011576 A1 | 1/2011 | Cavender et al. | |
| 2011/0017458 A1 | 1/2011 | East | |
| 2011/0024121 A1 | 2/2011 | Skeates | |
| 2011/0174490 A1 | 7/2011 | Taylor | |
| 2011/0188347 A1 | 8/2011 | Thiercelin | |
| 2013/0081807 A1 | 4/2013 | Dyer | |
| 2013/0087321 A1 * | 4/2013 | Bartko et al. | 166/66 |

OTHER PUBLICATIONS

International Search Report and Written Opinion dated Dec. 6, 2013 for related pct application PCT/ US2012/059361.
B. Bouldin, Production Technology Team Saudi Aramco Technology Quest, Oct. 20, 2011.

* cited by examiner

*Primary Examiner* — William P Neuder
(74) *Attorney, Agent, or Firm* — Bracewell & Guuliani LLP; Constance G. Rhebergen; Denver S. Bisignano

(57) ABSTRACT

Methods for determining hydraulic fracture geometry and/or areal extent of an area of interest in a reservoir, are provided. An exemplary method includes isolating downhole acoustic receiver equipment in a lower portion of a first wellbore from fracturing operations located in a second wellbore connected to the first wellbore. Communications between surface equipment in the downhole acoustic receiver equipment is provided through a communications conduit bypass that permits well operations in the second wellbore without interfering with communications between the surface equipment and the downhole acoustic receiver equipment.

52 Claims, 10 Drawing Sheets

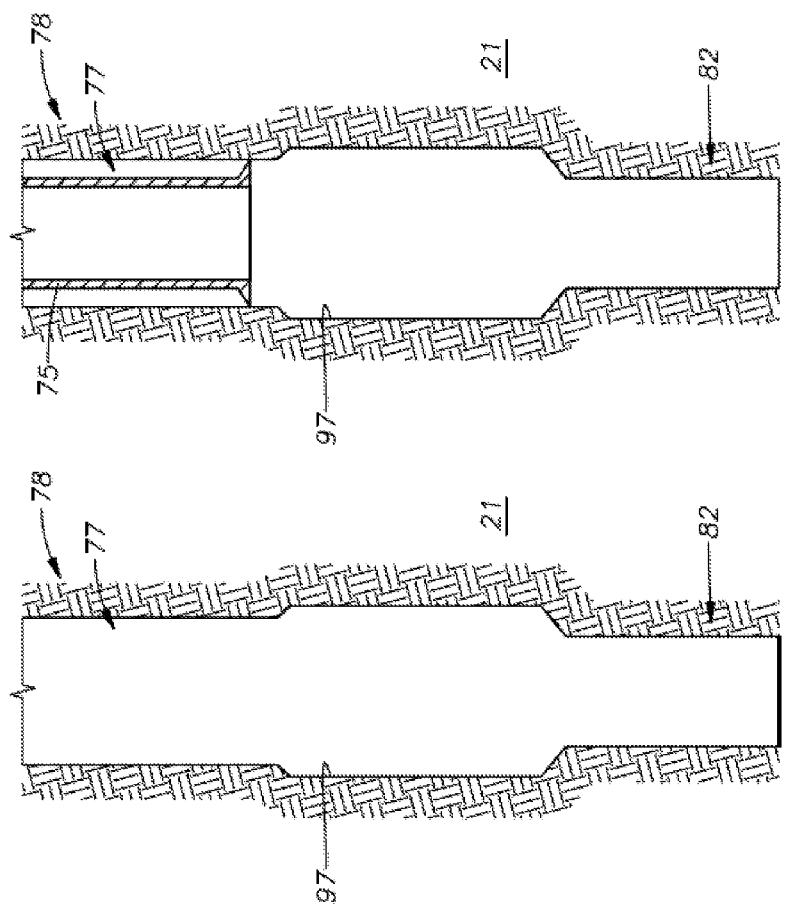

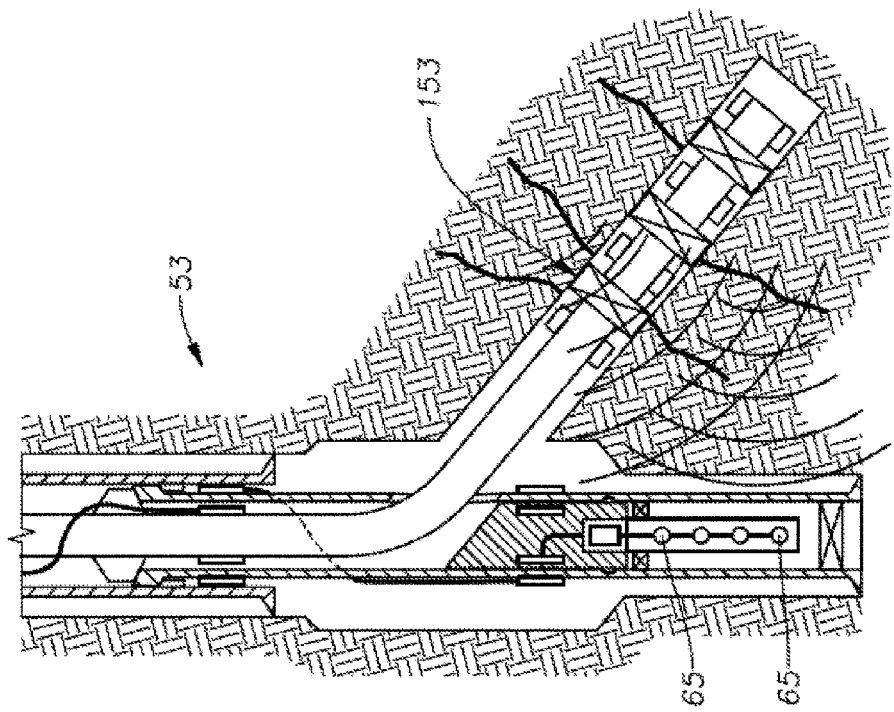
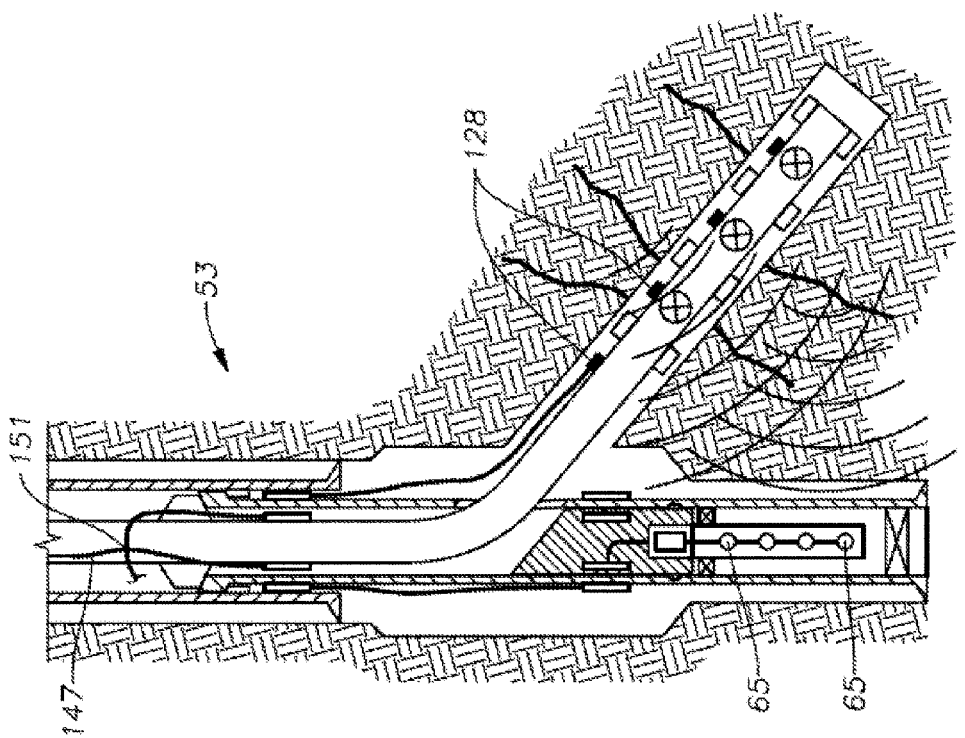

METHOD FOR REAL-TIME MONITORING AND TRANSMITTING HYDRAULIC FRACTURE SEISMIC EVENTS TO SURFACE USING THE PILOT HOLE OF THE TREATMENT WELL AS THE MONITORING WELL

RELATED APPLICATIONS

This application is related to U.S. Non-Provisional patent application Ser. No. 13/269,599, titled "System For Real-Time Monitoring and Transmitting Hydraulic Fracture Seismic Events To Surface Using The Pilot Hole Of The Treatment Well As the Monitoring Well," filed on Oct. 9, 2011, incorporated herein by reference in it's entirety.

BACKGROUND OF THE INVENTION

1. Field of the Invention

The present invention relates in general to the field of hydraulic fracturing, monitoring, and data transmission of microseismic information from a zone of interest within a reservoir, and more particularly, to the utilization and employment of electrically and physically isolated downhole acoustic monitoring equipment within a fracturing treatment well to detect microseismic events during fracturing operations.

2. Description of the Related Art

Hydraulic fracturing has been used for over 60 years in more than one million wells to improve the productivity of a hydrocarbon bearing formation, particularly those drilled in low permeability reservoirs. An estimated 90% of the natural gas wells in the United States alone use hydraulic fracturing to produce gas at economic rates. Successful hydraulic fracturing is generally considered vital for economic production of natural gas from shale beds and other 'tight gas' plays.

Fracturing treatment operations are typically employed in vertical, deviated, and horizontal wells. In a typical well development operation, the wellbore of the treatment well is drilled through the desired formation where the fracture treatment will take place.

The hydraulic fracture is formed by pumping a fluid into the wellbore at a rate sufficient to increase the pressure downhole to a value in excess of the fracture gradient of the formation rock in the area of interest. The pressure causes the formation to crack, allowing the fracturing fluid to enter and extend the crack further into the formation. One method to keep this fracture open after the injection stops is to add a solid proppant to the fracture fluid. The proppant, which is commonly sieved round sand or other nonporous material, is carried into the fracture. This sand is chosen to be higher in permeability than the surrounding formation, and the propped hydraulic fracture then becomes a high permeability conduit through which the formation fluids can flow to the well.

Determining the size and orientation of completed hydraulic fractures is quite difficult and expensive, and in less expensive alternatives, highly inaccurate. It is well known that hydraulic fractures create a series of small "earthquakes" that can be mapped to show the position of the fracture event. The technology currently in use deploys a series of microseismic detectors typically in the form of geophones inside a separate monitoring well to measure fracturing events while pumping a hydraulic fracture treatment. Deployment of geophones or tilt meters on the surface can also be used, but the resolution is significantly less as you go deeper in the well.

Tiltmeter arrays, deployed on the surface or in a nearby monitoring well, measure the horizontal gradient of the vertical displacement. Microseismic detector arrays, deployed in a nearby monitoring well or on the surface adjacent the zone of interest if it is not too deep and/or environmental noise is not too excessive, can detect individual microseismic events associated with discrete fracture opening events. The microseismic event can be located in three dimensions by a triangulation methodology based on comparing acoustic arrival times at various sensors in a receiver array. By mapping the location of small seismic events that are associated with the growing hydraulic fracture during the fracturing process, the approximate geometry of the fracture can be inferred.

Although the use of a monitoring well located separate from the treatment well is often preferred as it provides improved accuracy, particularly in areas with high environmental noise and/or relatively inaccessible surface conditions, the cost of drilling a monitor well is typically in the area of $10 million and requires 30-50 days of drilling rig time. Further, availability of surface real estate or other factors can prevent the monitoring well from being drilled sufficiently close to the area of interest, and thus, results in a degraded performance.

In order to try to reduce capital costs and deployment time, some progressive operators have, with minimal success, attempted to build a combination monitoring and treatment well by placing the acoustical sensors in the annulus of the treatment well. Some other operators, have instead chosen to deploy the acoustic sensors directly in the treatment flow path.

Recognized by the inventors, however, is that as a result of the pumping of the fracturing fluid, such acoustic sensors located along the annulus of the treatment well or within the flow path encounter substantial noise during the hydraulic fracturing events, which in turn, results in the collection of acoustic data having an excessively low signal-to-noise ratio. Accordingly, also recognized by the inventors is that this type of monitoring can generally only provide usable data when the fracture is closing, and thus, causes the operator to miss the fracturing events occurring while pumping the fracturing slurry.

Further recognized by the inventors is that due to the exposure limitations of the electrical data/power conduit (e.g., run with the acoustic sensors to transmit data to the surface), the operator is limited to certain slurry concentrations and is limited by the amount of total pressure that can be applied while fracturing due to the pressure limitation of the electric line cable heads. Still further, recognized by the inventors is that the deployment of acoustic sensors within the treatment flow or in the annulus adjacent current or potential future sidetracking operations can impede such operations.

Recognized, therefore, by the inventors is that there is a need for systems and processes that requires only a single treatment well to reduce capital costs and deployment time, that includes provisions for isolating the acoustic sensors to provide for gathering during pumping of the fracturing slurry downhole, acoustic data having an acceptable signal-to-noise ratio. Also recognized by the inventors is that there is a need for systems and processes that allow for high slurry concentrations and that allow for a total pressure necessary for optimal fracturing without concern for the pressure limitations of electric conduit/line cable heads in the communication pathway of the acoustic sensors, and/or that does not impede current or future sidetracking operations.

SUMMARY OF THE INVENTION

In view of the foregoing, various embodiments of the present invention advantageously provide systems and methods of/processes for determining hydraulic fracture geometry and areal extent of a zone of interest, that require utilization of only portions of a single treatment well to reduce capital costs and deployment time, that includes provisions for isolating acoustic monitoring sensors to provide for gathering acoustic data having an acceptable signal-to-noise ratio real-time during pumping of the fracturing slurry, that allows for high slurry concentrations, that allows for a total pressure necessary for optimal fracturing, without concern for the pressure limitations of the electric line cable heads, and/or that does not impede current or future sidetracking operations, and that can be employed for seismic monitoring in all types of hydraulic fracture operations, including fracturing unconventional or shale gas reservoirs.

More specifically, an example of an embodiment of a method to determine hydraulic fracture geometry and areal extent of a zone of interest in a reservoir, can include various steps including those to establish the well and to deploy the acoustic and communications equipment. According to an embodiment of the present invention, a well is drilled through a zone of interest and is either cased and cemented or left in an openhole environment. A kickover or other deflection-type tool is then deployed with the geophones or other acoustic receivers hung below at predetermined intervals to capture fracture events below, above and within the zone of interest. The geophones or other acoustic receivers are coupled to the casing or open hole section. Coupling of the geophones or other acoustic receivers can be accomplished by cementing them in place or hanging the geophones or other acoustic receivers in the cased or open hole with centralizers. A packer can also be used to isolate pressure from the fracturing operations and to isolate the geophones. If left un-cemented the deployed kickover/deflecting tool and geophones or other acoustic receivers can be retrieved at a later date.

During fracturing operations, data is transmitted up hole using, for example, a down hole electrical coupler to make an electrical connection down hole in well test operations. Utilization of coupling device can advantageously remove any physical contact between electrical connections and wellbore fluids. According to an exemplary configuration, power and/or communication signals are transmitted through the coupler via an A/C current that creates an electromagnetic (EM) field transmitted to the female coupler. As such, an advantage of this system is the positive power and communication provided across the coupling device.

Upon completion of the fracturing operation, a surface computer having received the acoustic data describing each microseismic fracture and then producing and graphically displaying a map of the hydraulic fracture geometry and extent of such fracturing.

According to another embodiment of a method, the method can include the steps of positioning an acoustic assembly within a first wellbore adjacent the zone of interest in the reservoir and drilled within a portion of a reservoir to receive a hydraulic fracturing treatment defining the zone of interest. The acoustic assembly can include an acoustic receiver controller, e.g., seismic brain, and a set of one or more acoustic sensors, e.g., geophones, tilt meters, etc., to capture fracture events within the zone of interest. The steps can also include isolating the set of one or more acoustic sensors from acoustic interference associated with delivery of fracturing fluid through a conduit string extending through portions of the first wellbore and into the second wellbore when performing the hydraulic fracturing of the reservoir in the zone of interest. Such isolization can advantageously serve to minimize noise encountered by the set of one or more acoustic sensors and associated with movement of fracturing fluid.

The steps can also include inserting a drilling deflector into the first wellbore, drilling a second wellbore to receive a fracturing fluid, and typically before drilling the second wellbore if not pre-drilled, positioning a communication conduit bypass within the first wellbore to extend from a first location above an interface with the second wellbore to a second location below the interface with the second wellbore.

The steps can also include detecting microseismic events associated with the performance of the hydraulic fracturing by employing the set of acoustic sensors, and communicating to a surface unit the real-time microseismic event data describing microseismic events detected by the acoustic assembly when performing hydraulic fracturing of the reservoir in the zone of interest through the second wellbore. In order to provide for such communication, the steps can further include coupling the acoustic receiver controller to a first coupler connected to a first end of the communication conduit bypass and positioned adjacent the second location below the lateral aperture, and coupling surface equipment to a second inductive coupler connected to a second opposite end of the communication conduit bypass and positioned adjacent the first location, for example, above the lateral aperture.

According to another embodiment of a method, the method can include the steps of positioning a kickover tool within a production liner in a first wellbore drilled within a portion of a reservoir to receive a hydraulic fracturing treatment defining a zone of interest, and positioning an acoustic assembly within the production liner in the first wellbore below major portions of the kickover tool and adjacent the zone of interest in the reservoir. The acoustic assembly can include an acoustic receiver controller and a set of one or more acoustic sensors to capture fracture events below, above, and within the zone of interest. The steps can also include isolating the set of one or more acoustic sensors from acoustic interference associated with delivery of fracturing fluid through a conduit string extending through portions of the first wellbore and into the second wellbore when performing the hydraulic fracturing of the reservoir in the zone of interest to thereby minimize noise encountered by the set of one or more acoustic sensors and associated with movement of fracturing fluid.

The steps can further include opening a lateral aperture in the production liner to form an entrance to a second wellbore to receive a fracturing fluid, and positioning a communication conduit bypass within the first wellbore to extend from a first location above the lateral aperture to a second location below the lateral aperture. The positioning of the communication conduit bypass is normally accomplished during deployment of the production liner in conjunction with the deployment of the acoustic assembly, and is later completed upon deployment of a tubing string.

The steps can also include detecting microseismic events associated with the performance of the hydraulic fracturing through employment of the set of acoustic sensors, and communicating to a surface unit, real-time microseismic event data describing microseismic events detected by the acoustic assembly when performing hydraulic fracturing of the reservoir in the zone of interest. The communications can be enabled by inductively coupling the acoustic receiver controller to a first inductive coupler connected to a first end of the communication conduit bypass and positioned adjacent the second location below the lateral aperture, inductively coupling surface equipment to a second inductive coupler connected to a second opposite end of the communication conduit bypass and positioned adjacent the first location above the lateral aperture.

According to another embodiment of a method, the method can include the steps of running a lower completion including wellbore sensors attached to a first connector within a well casing, running a communication conduit (lower umbilical) extending from a position outside the well casing adjacent the first connector to a position adjacent an operable position of a second connector, drilling a lateral wellbore oriented at least partially lateral to an orientation of the well casing and positioned at a location above the first connector and below the second connector, while avoiding intersection with the lower umbilical, and running an upper completion with a communication conduit (upper umbilical) attached to the second connector. The method can also include running a lateral completion attached below the upper completion, and/or providing a reservoir monitoring sensor or sensors with the lateral completion and connecting a lateral umbilical cord to extend from the sensor to a tee connection in the upper umbilical cord. The lateral completion can also carry a plurality of flow management components including inflow control valves, inflow control devices, and/or isolation packers.

According to an embodiment of the method, the steps can include sensing an acoustic event resulting from hydraulic fracturing of the formation adjacent the producing well and associated with the fracturing operations conducted through the lateral completion. Wellbore sensors, for example, in the form of acoustic sensors are positioned to detect the acoustic event at different times to facilitate locating the acoustic event. The steps can also or alternatively include the plurality of acoustic sensors sensing an acoustic event resulting from hydraulic fracturing associated with a lateral completion of an adjacent well. The steps can also or alternatively include positioning a packer below the lateral wellbore and above the plurality of acoustic sensors to minimize noise associated with movement of fracturing fluid through the lateral completion and encountered by the plurality of acoustic sensors to enhance data quality.

According to another embodiment of a method, the method can include the steps of providing a plurality of producing wells each producing well including an upper completion, a lower completion, and a lateral completion extending into a lateral wellbore, combining the functions of a subterranean observation well and a subterranean producing well into each separate one of the plurality of producing wells for each of the producing wells, and sensing an acoustic event resulting from hydraulic fracturing associated with the lateral completion of one of the plurality of producing wells. The combining the functions is performed, for example, by positioning a plurality of acoustic sensors in the lower completion, and hydraulically isolating the plurality of acoustic sensors from fracturing fluid flowing through the upper completion and the lateral completion. The isolation is provided via an isolation device such as a packer positioned below the lateral wellbore and above the plurality of acoustic sensors to minimize noise associated with movement of the fracturing fluid through the lateral completion and encountered by the plurality of acoustic sensors. Additionally, the sensing is advantageously performed by one or more of the plurality of acoustic sensors in at least two of the plurality of producing wells to enhance data accuracy.

According to an example of an embodiment of the present invention, a system to determine hydraulic fracture geometry and areal extent of a zone of interest in a reservoir, can include a main casing string extending within a first portion of a first wellbore, and a production liner connected to an inner surface of a portion of the casing string and extending into a second portion of the first wellbore and having a lateral aperture adjacent an opening into a lateral branch wellbore. The system can also include a kickover or other deflection tool positioned within the production liner at a location below major portions of the lateral aperture to facilitate the performance of drilling operations associated with the lateral branch wellbore and to isolate an acoustic assembly positioned within the production liner below the kickover tool adjacent a zone of interest from fracturing operations. The acoustic assembly can include an acoustic receiver controller and a set of one or more acoustic sensors to capture fracture events below, above, and within the zone of interest.

The system can also include a packer positioned within a bore of the production liner below major portions of the kickover tool and at a location above the set of one or more acoustic sensors to isolate the set of one or more acoustic sensors from acoustic interference associated with delivery of the fracturing fluid and/or can include a packer positioned within the bore of the production liner at a location below the set of acoustic sensors to hydraulically isolate the acoustic sensors within the bore of the production liner and/or to reduce acoustic interference from the fracturing components of the system.

The system also includes a tubing string extending through the first portion of the first wellbore, an upper portion of the second portion of the first wellbore, the lateral aperture, and portions of the lateral branch wellbore to deliver a fracturing fluid, and an inductive communication assembly positioned to receive data signals from the acoustic receiver controller and/or to provide power thereto and positioned to provide electrical isolation between lower completion equipment and upper completion equipment. According to a preferred configuration, the inductive communication assembly includes a communication conduit bypass positioned within the first wellbore and extending from a location above the lateral aperture to a location below the lateral aperture to prevent interference with the fracturing equipment or deployment thereof. Advantageously, the inductive communications assembly includes two sets of inductive couplings to isolate up hole communication components from the communication components adjacent the lateral branch wellbore and to isolate such communication components from the acoustic assembly components located below the kickover tool. Notably, desired electrical and physical isolations can be achieved by using such inductive coupling technology to connect surface equipment with the downhole acoustic monitoring equipment.

A system according to another embodiment of the present invention can include a first wellbore including a first portion containing fluid delivery conduits and a second portion containing an acoustic assembly positioned adjacent a zone of interest within a reservoir. The acoustic assembly can include an acoustic receiver controller and a set of one or more acoustic sensors in communication therewith to capture fracture events below, above, and within the zone of interest. The system also include a second wellbore connected to the first wellbore at a lateral aperture in the first wellbore located above the acoustic assembly and containing a fracture treatment system, whereby the second wellbore and fracturing treatment system is hydraulically isolated from the second portion of the first wellbore containing the acoustic assembly. The system can further include an inductively coupled communication conduit bypass positioned within the first and the second portions of the first wellbore and extending from a location above the lateral aperture to a location below the lateral aperture to provide well operations in the second wellbore devoid of any acoustic monitoring equipment and associated interfering communication conduits.

A system according to another embodiment of the present invention can include a lower completion comprising wellbore sensors (e.g., acoustic sensors, etc.) positioned within a well casing, a lower umbilical extending from a position outside the well casing to a position adjacent an operable position of a first connector, a lateral wellbore positioned to avoid intersection with the lower umbilical and oriented at least partially lateral to an orientation of the well casing, and an upper completion run with an upper umbilical attached to the first connector. According to an exemplary configuration, the lower umbilical and well casing containing the wellbore sensors are configured to be run together. According to an exemplary configuration, the first connector connects to the upper umbilical. A second connector within a bore of the well casing connects to the wellbore sensors. An entranceway to the lateral wellbore is positioned at a location above the second connector and below the first connector. According to an exemplary configuration, the first and the second connectors are configured to inductively couple to the lower umbilical.

According to an exemplary configuration, a packer is positioned below an entranceway to the lateral wellbore and above the plurality of acoustic sensors to minimize noise associated with movement of fracturing fluid through the lateral completion and encountered by the plurality of acoustic sensors and to isolate pressure encountered by the acoustic sensors. According to another exemplary configuration, the plurality of acoustic sensors are cemented in place to minimize noise encountered by the plurality of acoustic sensors and to isolate pressure.

A system according to another embodiment the present invention can include a lower completion comprising wellbore sensors (e.g., acoustic sensors, etc.) positioned within a well casing and positioned within a formation layer of interest, a lower umbilical extending from a position outside a portion of the well casing containing the well sensors to a position adjacent an operable position of a first connector, a lateral wellbore oriented at least partially lateral to an orientation of the well casing and positioned at least substantially within the formation layer of interest to thereby provide fracturing within the formation layer of interest, and an upper completion run with an upper umbilical attached to the connector, whereby the connector operably coupled to the lower umbilical. According to an exemplary configuration, the connector is a first connector connecting to the upper umbilical, and the wellbore sensors are connected to at least portions of a second connector having at least portions positioned within a bore of the well casing. According to an exemplary configuration, the entranceway to the lateral wellbore is positioned at a location above the second connector and below the first connector.

According to an exemplary configuration, a lateral completion is horizontally aligned at least substantially between upper and lower boundaries of the formation layer of interest to provide fracturing within the formation layer of interest. According to such configuration, the portion of the well casing containing the acoustic sensors is positioned between upper and lower boundaries of the formation layer of interest. According to an exemplary configuration, a portion of the formation layer of interest is fractured above and below the lateral completion. According to such exemplary configuration, the acoustic sensors are positioned to receive fracturing data for portions of the formation layer of interest located above the lateral completion and receive fracturing data from portions of the formation layer of interest located below the lateral completion.

Various embodiments of the present invention advantageously allow real time data transmission of seismic event data from the treatment well while pumping a hydraulic fracture treatment. Conventional practice is to drill an observation/monitoring well and to deploy geophones to monitor fracture seismic events during the fracture treatment or to deploy geophones at the surface. Often observation/monitoring wells or the surface is too far from the fracture treatment to allow collection of good quality monitoring data, and there are substantial costs associated with establishing an observation/monitoring well. Accordingly, to solve such problems, various embodiments of the present invention advantageously provide for utilization of a single treatment well to perform fracture seismic mapping without a need for a separate monitoring well or surface equipment deployment. This can be accomplished by deploying the acoustic sensors downhole in a portion of the treatment well, below the sidetrack well used for delivering the fracturing fluid. This portion of the treatment well can be, for example, a portion of the pilot hole for the treatment well extending beyond the desired entrance location of the sidetrack well. Advantageously, use of, for example, the original pilot hole in a sidetrack provides a significant reduction in the cost of fracturing by eliminating the drilling and completion of a separate monitoring well, which may typically cost $10.0 MM and 30-50 days of drilling rig time.

Various embodiments of the present invention also advantageously provide for isolating the acoustic sensors to provide for gathering acoustic data having an acceptable signal-to-noise ratio real-time during pumping, and/or provide for use of slurry concentrations greater than 4 PPA, by running the sensors below the kickover tool and/or installing a packer below the kickover tool to contain the acoustic sensors within the extended section of the main portion of the treatment well (e.g., the pilot hole)—separating the slurry carrying components and acoustic communications components so that they do not contact or otherwise communicate with each other. Advantageously, by placing the geophones below the kickover tool, the noise issue is reduced or eliminated with the use of simple filtering technology. Additionally, slurry limitations are eliminated, treating pressure is not limited to the tool deployed, and the geophones can be pre-positioned below, directly across the zone of interest and above the treatment interval.

Further, various embodiments of the present invention utilize an inductive coupler technology to provide for transmission of data to surface with real time measurements, which allows the acoustic sensors and acoustic receiver controller (e.g., seismic brain), to not only remain physically/hydraulically isolated, but also, electrically isolated—i.e., no electrical passageways or conduits providing communications between the acoustic receiver controller (e.g., seismic brain) and surface computer, need to be extended through the kickover tool or packer. The inductive coupler removes any physical contact between electrical connections and wellbore fluids. Power is transmitted through the coupler via an A/C current that creates an electromagnetic (EM) field transmitted to the female coupler. An additional advantage of this system is the positive power and communication provided across the coupling device.

Various embodiments of the present invention further advantageously provide for the use of a total pressure necessary for optimal fracturing, without concern for the pressure limitations of electric line cable heads providing communications between an acoustic assembly and a surface unit, and/or provide for employment of a monitoring system within the treatment well that does not impede current or future sidetracking operations. By employing the inductive coupling technology, electrical telemetry is transferred from inside the well to external of the production liner at a location above an anticipated or existing aperture in the production liner by a first inductive coupling and is returned to be inside the well and at location below the anticipated or existing location of the kickover tool by a second inductive coupling, with the cabling between the two couplings routed external to the production liner away from the location of the anticipated or existing aperture in the production liner.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 3-11 provide a series of schematic diagrams illustrating the development of a main wellbore, a wellbore for performing fracturing operations, and deployment of the downhole portion of a system for determining hydraulic fracture geometry and areal extent of an area/zone of interest within a reservoir according to embodiments of the present invention;

FIG. 15 is a schematic diagram illustrating a plurality of taps in a primary umbilical cord illustrating use of the umbilical cord as a primary communications link between both downhole acoustic sensors and reservoir monitoring sensors according to an embodiment of the present invention;

FIG. 16 is a schematic diagram illustrating application of a plurality of flow control devices according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Various embodiments of the present invention advantageously provide systems and methods for real-time monitoring of hydraulic fractures using the treatment well pilot hole. According to an exemplary embodiment of the present invention, the well is drilled through the desired formation where the fracture treatment will take place. A kickover or other deflecting tool is then lowered into the wellbore and oriented to the preferred fractured orientation. Below the kick-over tool are acoustical sensors. At least one sensor is run, but preferably a series of sensors are run below the kickover tool. With the kickover tool in place, a sidetrack is drilled either as a vertical or horizontal wellbore. Advantageously, multiple sidetracks can be placed if required by stacking the kickover tools. Noise while pumping the fracturing fluid will be further minimized by placing a packer located below the kickover tool. The following provides additional details according to an exemplary embodiments of the present invention.

Figure 1:
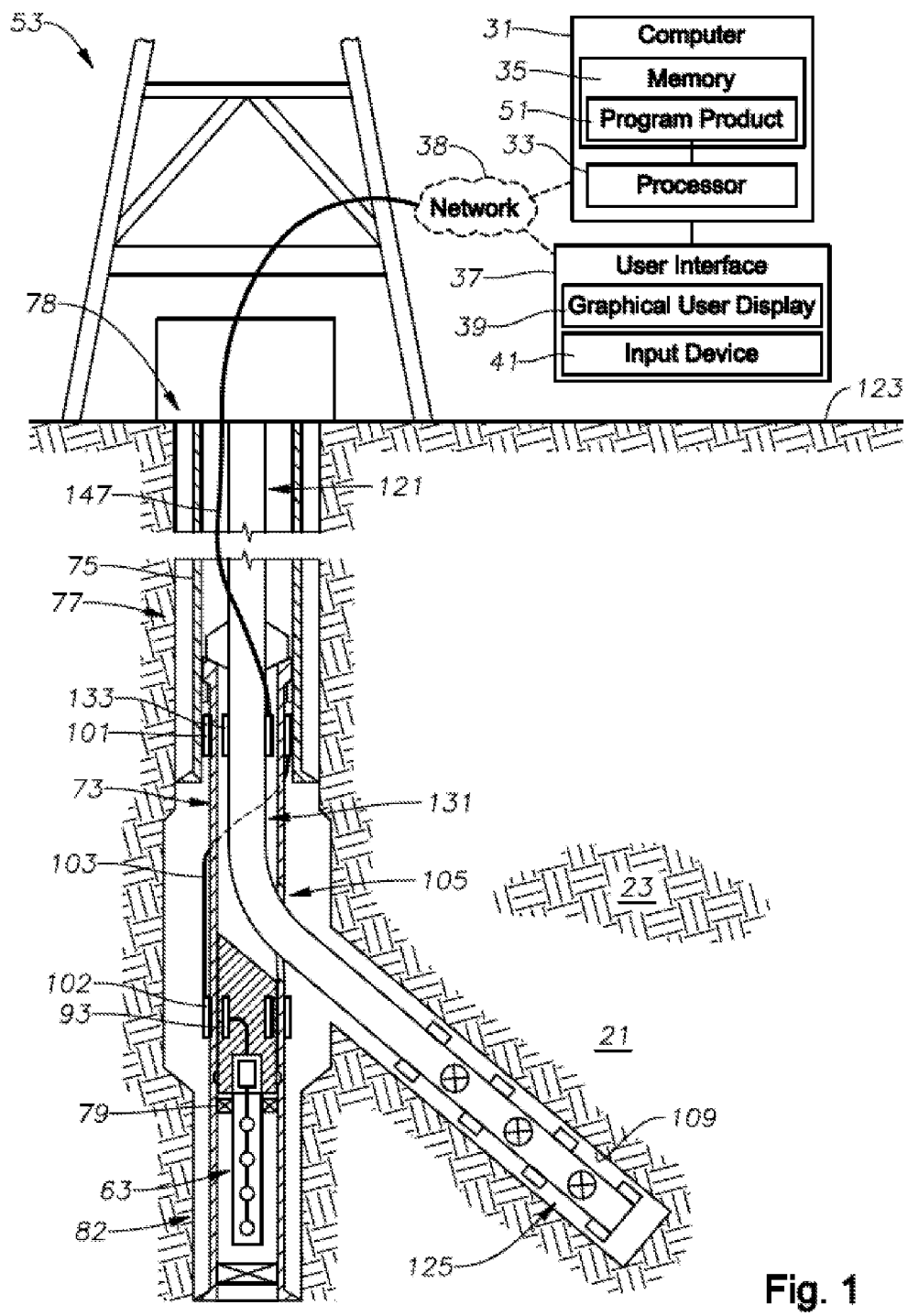
FIG. 1 is a schematic diagram of a general system architecture of a system for determining hydraulic fracture geometry and areal extent of an area/zone of interest within a reservoir according to an embodiment of the present invention.

As shown in FIG. 1, a system 30 to determine hydraulic fracture geometry and areal extent of an area of interest 21 of a reservoir 23 can include a fracture mapping computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server or server farm serving multiple user interfaces 37 or other configuration known to those skilled in the art. Accordingly, the user interface 37 can be either directly connected to the computer 31 or through a network 38 as known to those skilled in the art.

The system 30 can also include a database (not shown) stored in the memory 35 (internal or external) of the fracture mapping computer 31 and having data indicating position points of detected seismic events, and can include fracture mapping program product 51 stored in memory 35 of the fracture mapping computer 31 and adapted to receive signals from an acoustic receiver controller 61. Note, the fracture mapping program product 51 can be in the form of microcode, programs, routines, and symbolic languages that provide a specific set for sets of ordered operations that control the functioning of the hardware and direct its operation, as known and understood by those skilled in the art. Note also, the fracture mapping program product 51, according to an embodiment of the present invention, need not reside in its entirety in volatile memory, but can be selectively loaded, as necessary, according to various methodologies as known and understood by those skilled in the art. Still further, at least portions of the fracture mapping program product 51 can be stored in memory of the acoustic receiver controller 61 and/or executed by acoustic receiver controller 61.

Figure 2:
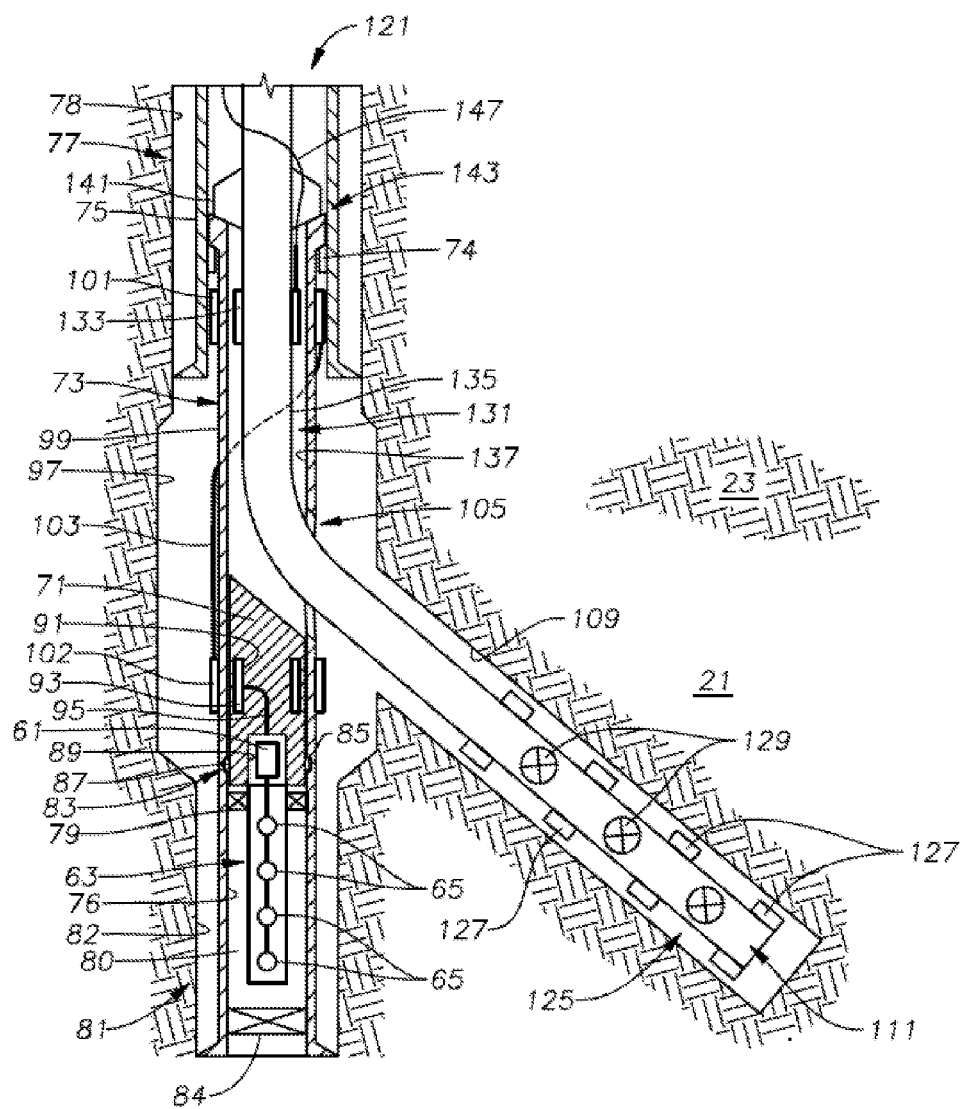
FIG. 2 is a schematic diagram of the downhole portion of a system for determining hydraulic fracture geometry and areal extent of an area/zone of interest within a reservoir according to an embodiment of the present invention.

As shown in FIGS. 1 and 2, the system 30 also includes an acoustic assembly 63 including the acoustic receiver controller (e.g., seismic brain) 61 and a set of at least one, but more typically a plurality of acoustic sensors (e.g., geophones, hydrophones, etc.) 65 hung below a kickover or other drilling deflection-type tool 71 positioned within a production or other liner 73, itself hung within a casing 75 itself positioned within a main portion 77 of a typically vertical wellbore 78. In a cased hole configuration, liner 73 is hung within casing 75 using a casing hangar 74 or other means as understood by one of ordinary skill in the art.

According to the illustrated embodiment of the system 30, the set of acoustic sensors 65 include multiple spaced apart sensors spaced at a predetermined distance or distances capture the same set of fracturing events, but at different travel times, to allow for triangulation of the received acoustic signals emanating from each separate fracture event. Note, as shown in FIG. 2, a packer or packers 79, 84 as known and understood by those of ordinary skill in the art can optionally be installed within the bore 76 of the production liner 73 prior to the installation of kickover tool 71. According to one embodiment, the packer 79 is positioned below the kickover tool 71 at a location above the acoustic assembly 63 to isolate the sensors 65 from acoustic interference. In such embodiment, a centralizer (not shown) or other connection device can be used to stabilize the sensors 65 within the bore 76 of the liner 73. According to an alternative embodiment, the packer 84 as installed below the acoustic assembly 63 to hydraulically seal chamber 80 within liner 73 to contain the acoustic assembly 63, and in conjunction with the kickover tool 71 (or other whipstock-type tool) and/or another packer 79 adjacent thereto, to thereby prevent hydraulic incursions.

According to the illustrated embodiment of the system 30, wellbore 78 includes the main or "upper formation" portion 77 and a "lower formation" portion 81 primarily comprising the pilot hole 82 drilled to guide drilling of the main portion 77 of the wellbore 78. As shown in the figures, according to such configuration, the acoustic assembly 63 and at least portions of the kickover tool 71 are landed within the lower portion 81 of the wellbore 78 (e.g., within chamber 80), and/or physically connected to hang from the kickover tool 71.

A locator key 83 comprising a recess-protuberance combination, illustrated as a recess 85 in the liner 73 and an annular protuberance 87 or set of one or more individual protuberances extending radially from the lower portion of the kickover tool 71, can be utilized to properly orient the kickover tool 71 and/or the set of acoustic sensors 65. Note, other means including a protuberance-recess combination or utilization of a centralizer (not shown) supporting or landing the set of acoustic sensors 65 and/or the kickover tool 71, or other means known to one of ordinary skill in the art, however, is/are within the scope of the present invention.

According to the illustrated embodiment of the system 30, the kickover tool 71 includes a recess 89 containing at least portions of the acoustic receiver controller 61 or associated connection hardware (not shown) as understood by one of ordinary skill in the art. The kickover tool 71 also includes an annular recess 91 housing a male inductive coupler 93 (individual or assembly) connected to an electrical conduit 95 connected to or otherwise in communication with the acoustic receiver controller 61. Note, the locator key 83 provides both positioning of the kickover tool 71 and positioning of the male inductive coupler 93. Note also, as described is being electrical conduit, conduit 91 can take other forms including optical, RF, etc. or combination thereof.

Further, according to the illustrated embodiments of the system 30, the liner 73 is landed within a lower end of the casing 75, preferably at least partially within a portion 97 of the wellbore 78 extended out, for example, by an "undee" ream bit (not shown), using means as known and understood by one of ordinary skill in the art. According to a preferred configuration, the external surface 99 of the liner 73 carries a set of female inductive couplers 101, 102 connected via a communication conduit, e.g., electrical cable 103 routed along the external surface 99 of the liner 73, above and below a radial aperture 105, respectively. The radial aperture 105 is pre-formed prior to landing of the liner 73 or later cut through the exterior wall 99 of the liner 73 to provide a pathway for a "sidekick" drilled as a horizontal or vertical wellbore (e.g., lateral wellbore 109) carrying the various fracturing equipment 111. As such, beneficially, the female inductive couplers 101, 102 and the cable 103 do not impede fracturing operations or formation of the lateral wellbore 109.

The system 30 also includes a string of tubing 121 extending from a surface 123 (FIG. 1), through the main portion 77 of the wellbore 78 and casing 75, through the bore of liner 73 above aperture 105, through aperture 105, and into wellbore 109. The portion 125 of the tubing string 121 contained within wellbore 109 can include the various fracturing equipment 111 including multiple sets of perforations 127 to pass fracturing fluid into the reservoir 23, and can include multiple fracturing valves 129 to control fluid (e.g. slurry) delivery within each set of perforations 127, to thereby provide for multi-stage fracturing.

A portion 131 of the tubing string 121 located above the aperture 105 can house or otherwise carry a male inductive coupler 133 on its exterior surface 99. The male inductive coupler 133 is sized to be deployed within the inner diameter 137 of liner 73. When properly deployed with portion 131 of tubing string 121, male inductive coupler 133 is positioned to complement the female inductive coupler 101 connected to the exterior surface 99 of liner 73. Correspondingly, the portion 131 can include a tubing locator 141 sized to extend through casing 75 and to land upon an upper portion 143 of the casing hangar 74 hanging liner 73 (defining a landing point or surface 143). The male inductive coupler 133 is spaced apart at a predetermined longitudinal distance from the tubing locator 141 so that when the tubing locator 141 is landed upon landing point/surface 143, the male inductive coupler 133 is in a proper juxtaposition with female inductive coupler 101. The locator key 83, described previously, locates the male inductive coupler 93 in the proper juxtaposition with female inductive coupler 102, to thereby form a properly matched inductive circuit 145 (see, e.g., FIG. 13).

Figure 17:
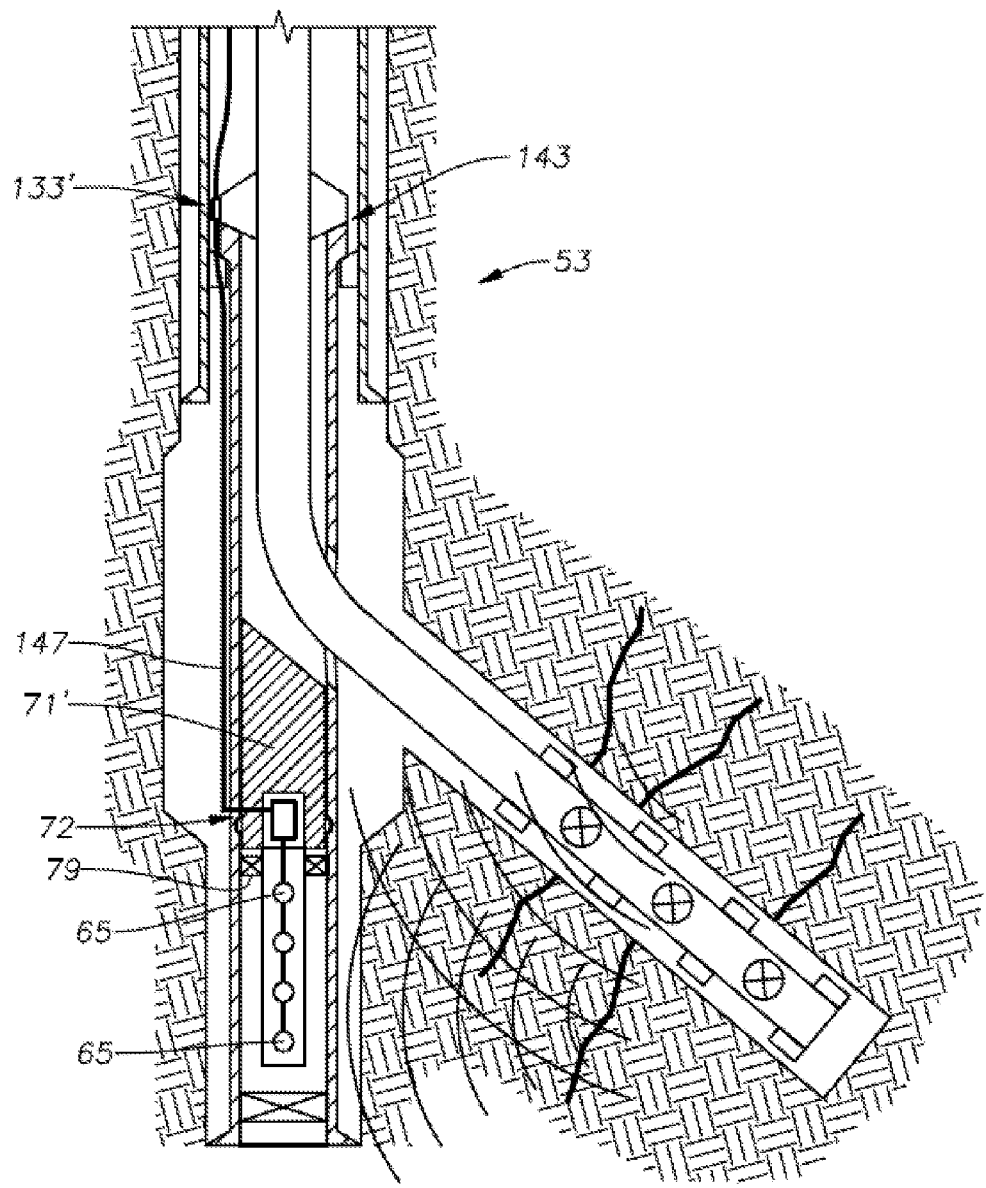
FIG. 17 is a schematic diagram illustrating a communication line connection configuration between surface components and downhole acoustic sensors according to an embodiment of the present invention.

A communication conduit, e.g., electrical cable 147 is physically connected to outer surface portions of the exterior surface 135 of the tubing string 121 and electrically connected to male inductive coupler 133, e.g., via a wet connector, to provide data to computer 31. Beneficially, the electrical and physical isolations can be achieved by using inductive coupler pairs 101, 133, and 102, 93, to connect the surface equipment (e.g., computer 31) with the downhole acoustic monitoring assembly 63. Note, although described as being electrical conductors, it should be understood that conduits/cables 103, 147 can take various forms including electrical, optical, electro-optical, wireless, hydraulic or a combination thereof and are often collectively referred to as umbilicals. Note also, as shown in FIG. 17, although illustrated in the form of an inductive coupling, conduit/cable 103 can be hard-line connected to the acoustic assembly 63 via a connection with/through kickover tool 71' and can be connected to conduit/cable 147 via connector 133' illustrated as being positioned adjacent landing point 143.

FIGS. 1 and 2 illustrate a "cased hole" configuration of the wellbores 78, 109. One of ordinary skill in the art, however, would recognize that one or more embodiments of the present invention fall within the scope of the system 30 employed in non-cased wellbores. Additionally, in the exemplary illustration, the casing 75 is 9⅝ inch casing, the tubing liner is 7 inch, and the tubing string 121 is 4½ tubing, and the lateral wellbore 109 is 6⅛ inch. Various other sizes as known to those of ordinary skill in the art, however, are within the scope of the present invention.

FIGS. 3-12 illustrate examples of embodiments of a method of determining hydraulic fracture geometry and areal extent of an area/zone of interest 21 in a reservoir 23 by combining functions of a subterranean observation well and a subterranean producing well into a single producing well 53. Referring to FIG. 3, according to an example of an embodiment of the method, a wellbore 78 is drilled through the area/zone of interest 21 and is either cased and cemented or left in an openhole state. According to the illustrated method, a pilot hole 82 is first drilled followed by the main portion 77.

As illustrated in FIG. 3, an undee reaming bit (not shown) can be used to widen the portion of the wellbore 78 at a location where a sidekick (e.g., wellbore 109, FIG. 2) is to be drilled. As shown in FIG. 4, in the illustrated cased-hole configuration, casing 75 is run within the upper portion 77 of the wellbore 78 above the undee 97.

Figure 5:
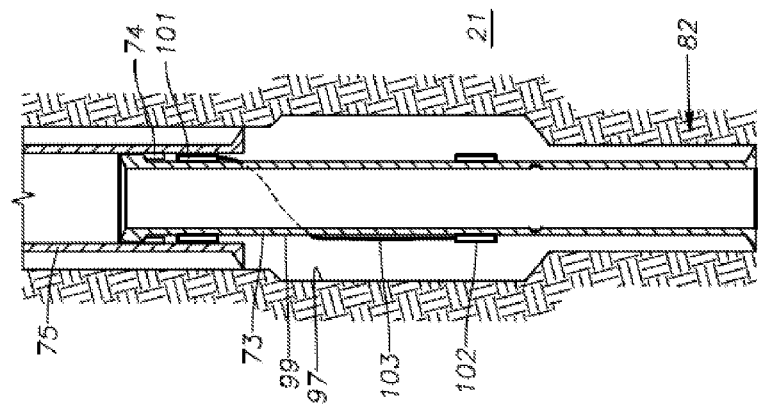

As illustrated in FIG. 5, liner 73 is hung within casing 75 using a casing hangar 74 or other means as understood by one of ordinary skill in the art. According to the illustrated configuration, liner 73 extends from above undee 97, through undee 97, and through significant portions of the pilot hole 82 preferably having an inner diameter similar to that of the liner 73. As further illustrated in FIG. 5, liner 73 includes female inductive couplers 101, 102, connected to or embedded within an outer/exterior surface 99.

Figure 7:
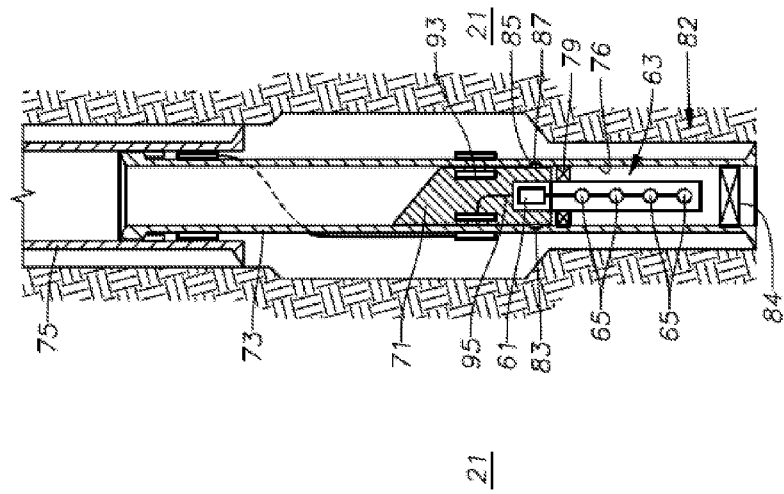
Figure 6:
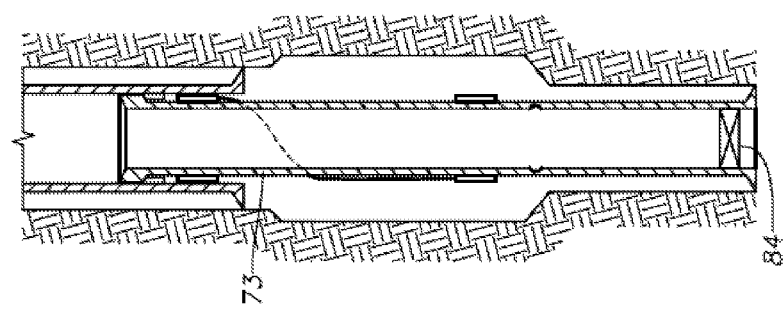

As illustrated in FIGS. 6 and 7, in order to acoustically isolate the set of acoustic sensors 65, a packer 79 can be positioned at a location below the kickover tool or other deflection-type tool 71 but above at least the acoustic sensors 65. In order to acoustically isolate further hydraulically isolate acoustic assembly 63, a packer 84 can also or alternatively be inserted within the bore 76 of the liner 73 at a location below the lowest (most downhole) expected point of the acoustic assembly 63.

As illustrated in FIG. 7, regardless of whether or not packer 79 is run, the method includes running a kickover or other deflection-type tool 71 to isolate the acoustic assembly 63 from the fracturing operations, described below. According to an exemplary configuration, the kickover tool 71 is deployed with geophones or other acoustic receivers 65 hung below at predetermined intervals to capture fracture events below, above and within the area/zone of interest 21. The geophones or other acoustic receivers 65 can be coupled to the inner surface of the tubing liner 73 or alternatively, directly to the open hole section of the pilot hole 82. Coupling of the geophones or other acoustic receivers 65 can be accomplished by cementing them in place in either the open hole or cased hole or hanging the geophones or other acoustic receivers 65 in the cased hole or the open hole using centralizers (not shown). Note, if left un-cemented, the kickover tool 71 and acoustic receivers 65 can be retrieved at a later date.

Figure 8:
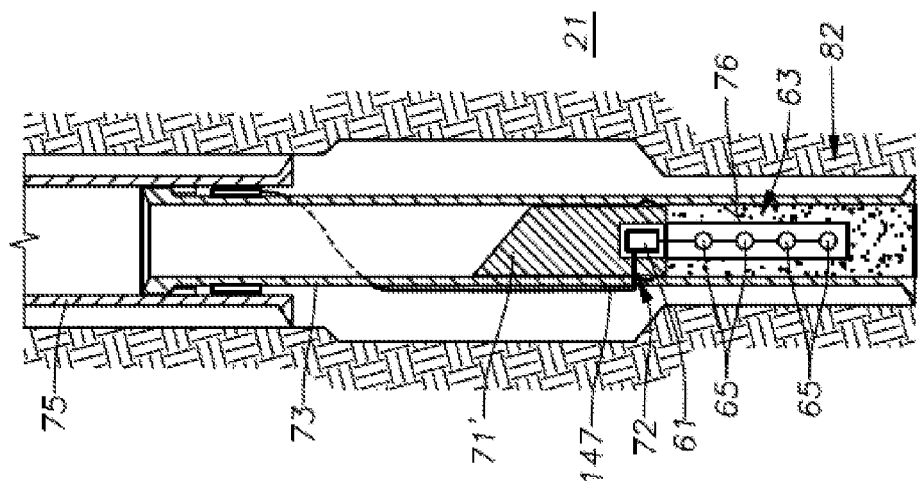
Figure 9:
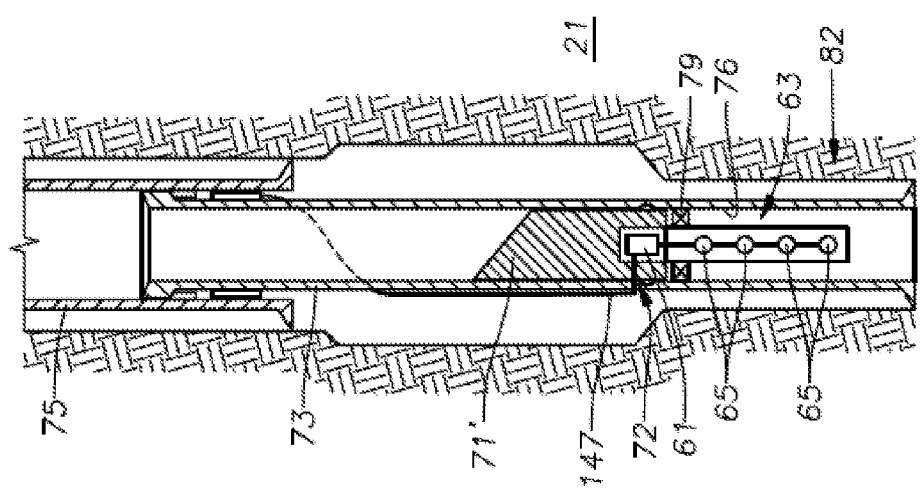

As illustrated in FIG. 8, according to another configuration, the casing 75, liner 73, kick over tool 71', packer 79, acoustic assembly 63, upper and lower communication conduits 103, 147, and the upper inductive coupler 101 can be run together. Although inductive coupler pair 102, 93 can also be run, according to such configuration, as shown in the figure, conduit 103 can instead be hardwired to acoustic controller 61 through passageway 72. FIG. 9 illustrates an embodiment whereby the acoustic sensors 65 of the acoustic assembly 63 are instead cemented to reduce noise and/or isolate pressure that would otherwise be encountered by the acoustic sensors 65.

Figure 10:
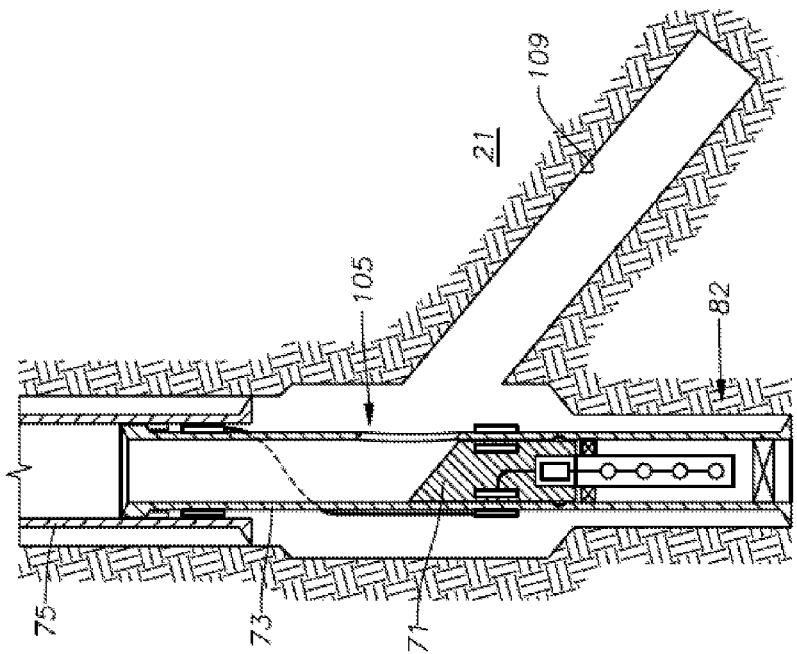

Regardless of the running methodology, as illustrated in FIG. 10, having the kickover tool 71 positioned within liner 73 (or directly within the pilot hole 82 if no liner 73 was utilized), wellbore 109 is drilled through aperture 105 at a desired length and distance and depth.

Figure 11:
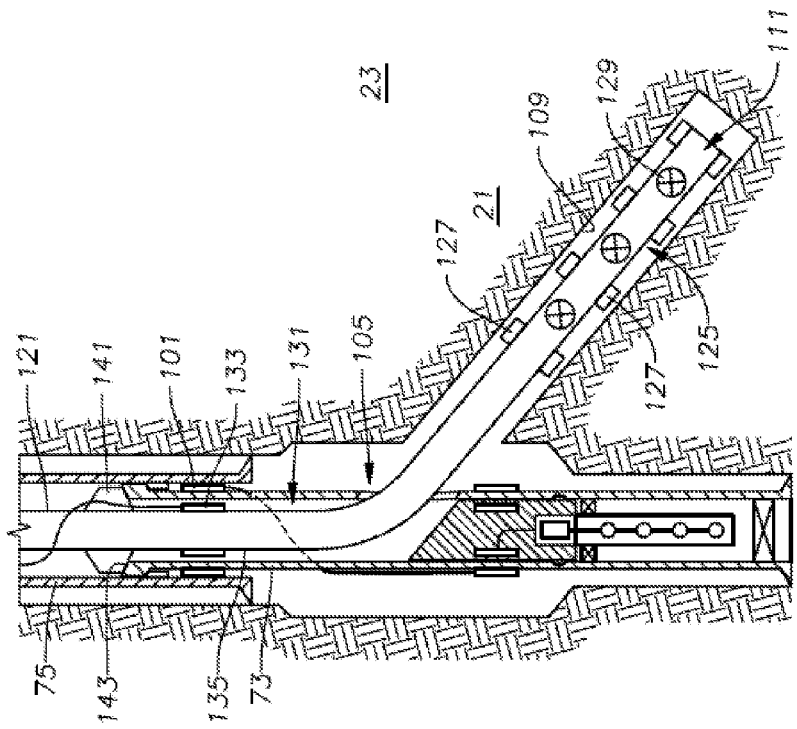

As illustrated in FIG. 11, a tubing string 121 is run from surface 123 (FIG. 1), through the casing 75, through the bore of liner 73 above aperture 105, through aperture 105, and into wellbore 109. The portion 125 of the tubing string 121 contained within wellbore 109 can include the various fracturing equipment 111 including multiple sets of perforations 127 to pass fracturing fluid into the reservoir 23, and fracturing valves 129 to control fluid (e.g. slurry) delivery within each set of perforations 127. The portion 131 of the tubing string 121 located above the aperture 105 can house or otherwise carry the male inductive coupler 133 on its exterior surface 135. In order to place male inductive coupler 133 in a proper juxtaposition with female inductive coupler 101, the deployment of tubing string 121 includes landing a tubing locator 141 in contact with a landing point/surface 143.

Figure 13:
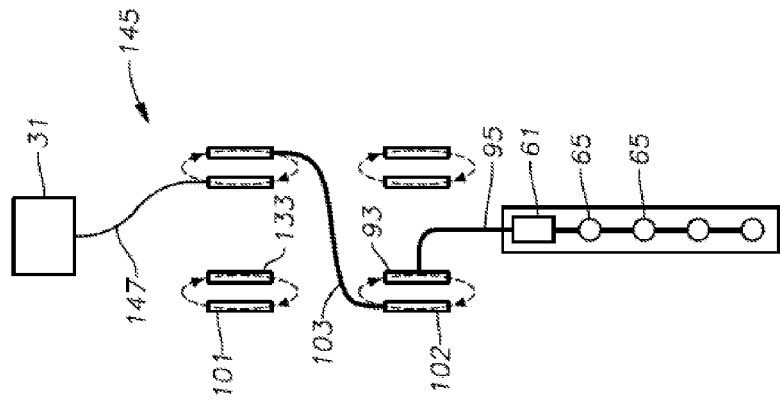
FIG. 13 is a schematic diagram of an inductive circuit according to an embodiment of the present invention.
Figure 12:
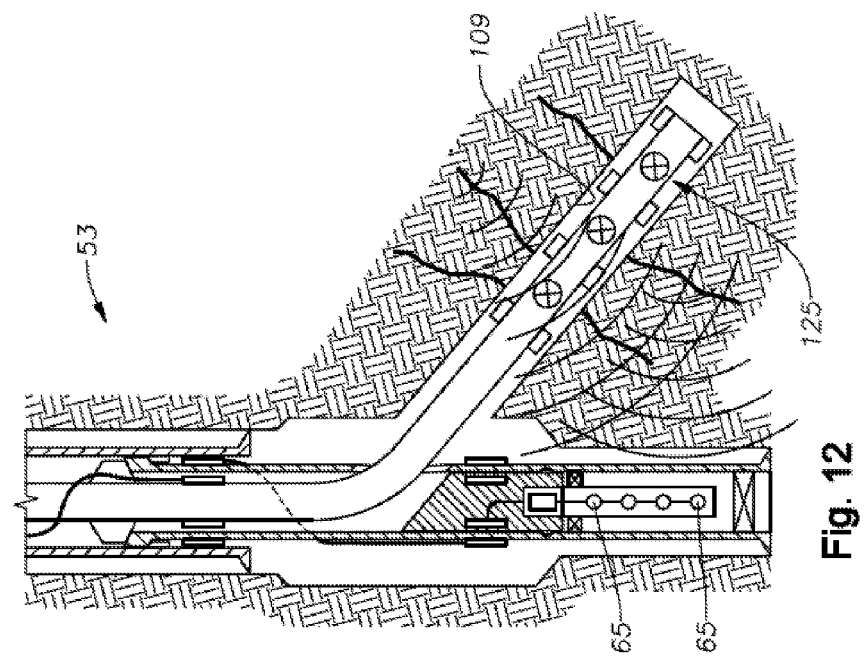
FIG. 12 is a schematic diagram illustrating operational employment of downhole portions of a system for determining hydraulic fracture geometry and areal extent of an area/zone of interest within a reservoir according to an embodiment of the present invention.

As illustrated in FIG. 12, during pumping operations, microfractures begin generating acoustic signals which are received at different times by the separated acoustic receivers 65. As illustrated in FIG. 13, in the illustrated embodiment whereby communications are established between the surface 123 (e.g., computer 31) and the acoustic sensors 65 utilizing inductive coupling, an inductive circuit is formed as illustrated, which can provide a reliable means to make an electrical connection down hole in well test operations. Processed acoustic data, processed by acoustic controller 61, is transmitted uphole via the illustrated circuit through the illustrated series of conductor connections and inductive couplings.

Beneficially, the utilization of the inductive coupling, particularly in conjunction with the establishment of separate electrical connections which do not across boundaries, can function to remove any physical contact between electrical connections and wellbore fluids. An advantage of this system/process is the positive communication provided across the coupling devices. The inductive couplings function so that communication signals emanating from acoustic controller 61 are transmitted through an A/C current created in male coupler 93, which creates an electromagnetic (EM) field transmitted to the female the coupler 102.

Figure 14:
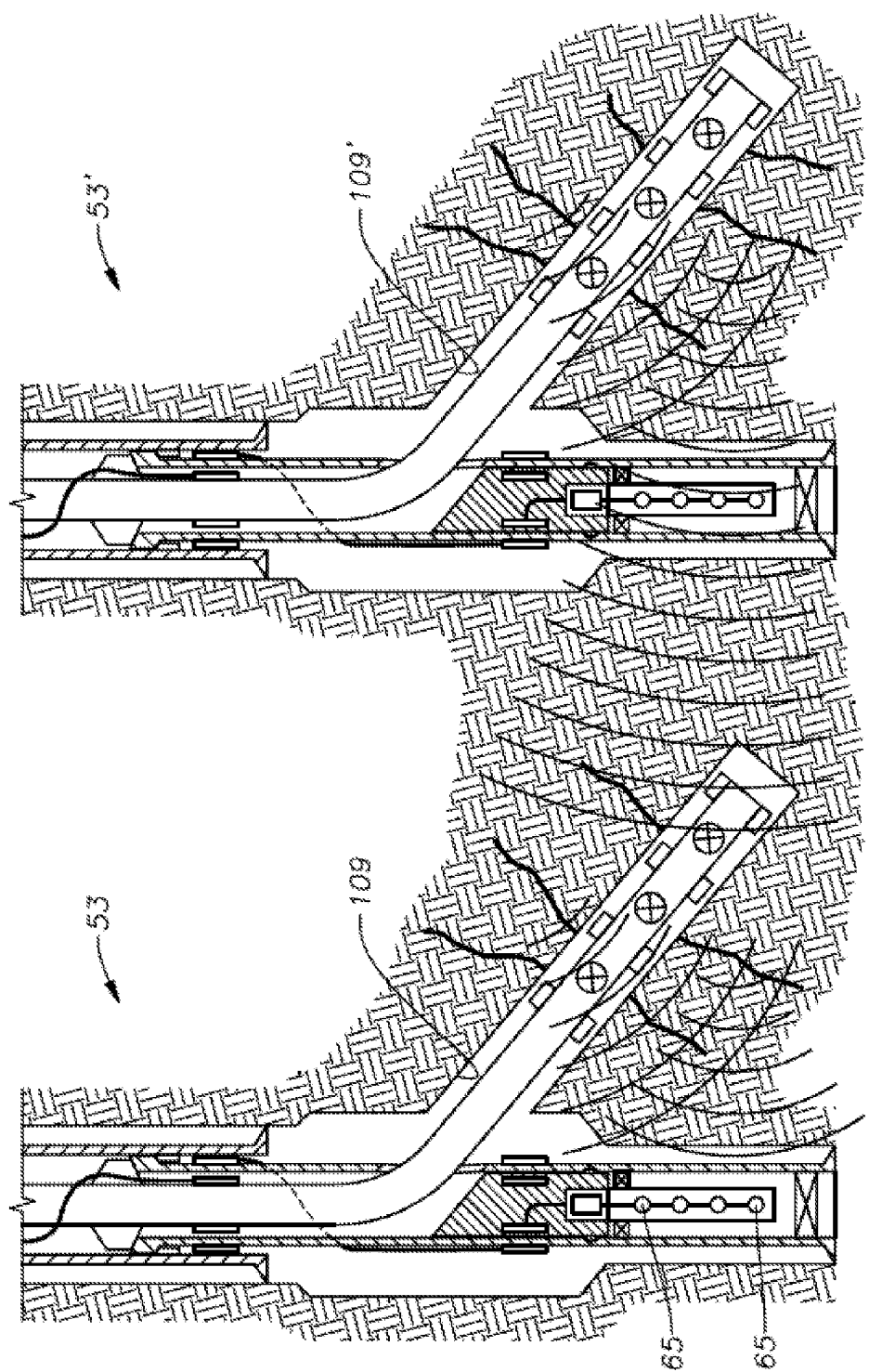
FIG. 14 is a schematic diagram illustrating duplicate portions of a system for determining hydraulic fracture geometry and areal extent of an area/zone of interest employed in a pair of adjacent producing wells, commonly receiving, processing, and providing complementary data for each other according to an embodiment of the present invention.

Similarly, FIG. 14 illustrates acoustic sensors 65 receiving acoustic signals from microfracture sources resulting from fracturing operations adjacent separate lateral wellbores 109, 109'. In this embodiment, however, the other lateral wellbore 109' is associated with an adjacent producing well 53'. Further, data from the respective acoustic controllers 61 associated with each respective producing well 53, 53' can be gathered by computer 31 via network 38 and compared. Alternatively, each producing well 53, 53' can have a separate computer 31 associated therewith in communication with each other through network 38 and/or another network as known to one of ordinary skill in the art.

According to another embodiment of the present invention, the system/process also includes an advantage whereby power can be delivered across the coupling devices to provide power to the acoustic assembly 63. In yet another embodiment of the present invention, an additional coupling can be made with inductive coupler 133, inductive coupler 101, and/or a Tee-type connection 151 or other form of tap or series of taps in cable 147 (FIG. 15) to provide power and/or communications to the fracturing equipment 111 from the surface 123 and/or provide support to reservoir monitoring sensors 128 such as, for example, pressure, temperature, flow, DTS sensors, etc. According to an embodiment, a plurality of reservoir monitoring sensors 128 can provide various reservoir condition sensing functions to include providing or providing for determining conductivity for waterfront observation, along with others known to those of ordinary skill in the art.

FIG. 16 illustrates another embodiment of the present invention whereby improved production control is achieved through application of one or more flow management components 153 such as, for example, inflow control valves, inflow control devices, and/or isolation packers.

This application is related to U.S. Non-Provisional patent application Ser. No. 13/269 599, titled "System For Real-Time Monitoring and Transmitting Hydraulic Fracture Seismic Events To Surface Using The Pilot Hole Of The Treatment Well As the Monitoring Well," filed on Oct. 9, 2011, incorporated herein by reference in it's entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, in place of the inductive coupling portions of inductive coupling circuit 145, connectors such as, e.g., wet mate connectors can be employed as a substitute for the sets of inductive coupling, albeit with some degradation to the advantages of the above described embodiments of the featured system that employ inductive coupling.

That claimed is:

1. A method of determining hydraulic fracture geometry in a reservoir by combining functions of a first subterranean well and functions of a second subterranean well into a single well, the method comprising the steps of:
    running a lower completion comprising wellbore sensors positioned within a well casing;
    running a communication conduit defining a lower umbilical, the lower umbilical extending from a position outside the well casing containing the well sensors, adjacent an operable position of a second connector, to a position adjacent an operable position of a first connector;
    drilling a lateral wellbore, avoiding intersection with the lower umbilical, the lateral wellbore oriented at least partially lateral to an orientation of the well casing; and
    running an upper completion with a communication conduit defining an upper umbilical, the upper umbilical operably connected to the first connector.

2. A method as defined in claim 1, wherein the step of running the lower completion and the step of running a communication conduit are performed simultaneously, the communication conduit defining the lower umbilical and the well casing containing the wellbore sensors being run together.

3. A method as defined in claim 1, wherein the functions of a first subterranean well comprise functions of a subterranean observation well, wherein the functions of a second subterranean well comprise functions of a subterranean producing well, and wherein the single well comprises a single producing well.

4. A method as defined in claim 3, wherein the second connector is operably coupled to the wellbore sensors within a bore of the well casing.

5. A method as defined in claim 4, wherein the step of drilling the lateral wellbore comprises positioning an entranceway to the lateral wellbore at a location above the second connector and below the first connector.

6. A method as defined in claim 1, further comprising the step of:
    running a lateral completion attached below the upper completion.

7. A method as defined in claim 1, further comprising the step of:
    running a lateral completion below the upper completion,
    wherein at least one reservoir monitoring sensor is connected to the lateral completion,
    wherein a lateral umbilical is positioned to extend from the at least one reservoir monitoring sensor to a tee connection in the upper umbilical.

8. A method as defined in claim 7, further comprising the step of:
    positioning one or more monitoring sensors in the lateral completion, the one or more monitoring sensors comprising one or more of the following: a pressure sensor, a temperature sensor, a flow sensor, and a fluid sensor.

9. A method as defined in claim 7,
    wherein one or both of the following: the first connector comprises a wet connector coupled to the upper umbilical and the second connector comprises a wet connector coupled to the wellbore sensors; and
    wherein the lateral completion includes a plurality of flow management components comprising one or more of the following: inflow control valves, inflow control devices, and isolation packers.

10. A method as defined in claim 3, wherein a portion of the formation layer of interest associated with the producing well is fractured, and wherein the wellbore sensors within the well casing comprise a plurality of acoustic sensors.

11. A method as defined in claim 10, further comprising the step of:
    sensing an acoustic event by the plurality of acoustic sensors, the acoustic event resulting from hydraulic fracturing associated with the lateral completion.

12. A method as defined in claim 10, further comprising the step of:
    sensing an acoustic event by the plurality of acoustic sensors, the acoustic event resulting from hydraulic fracturing associated with a lateral completion of an adjacent well.

13. A method as defined in claim 10, further comprising the step of:
    positioning a packer below an entranceway to the lateral wellbore and above the plurality of acoustic sensors to minimize noise associated with movement of fracturing fluid through the lateral completion and encountered by the plurality of acoustic sensors.

14. A method as defined in claim 1, further comprising the step of:
    running a plurality of lateral completions below the upper completion, each lateral completion having at least one reservoir monitoring sensor connected thereto and operably coupled to a lateral umbilical positioned to connect to the upper umbilical.

15. A method as defined in claim 3, wherein a portion of the formation layer of interest associated with the producing well is fractured, wherein the wellbore sensors within the well casing comprise a plurality of acoustic sensors, and wherein the plurality of acoustic sensors are connected to an acoustic sensor controller, the acoustic sensor controller configured to monitor reservoir monitoring events including conductivity for waterflood front observation.

16. A method as defined in claim 1,
wherein the functions of a first subterranean well comprise functions of a subterranean observation well;
wherein the functions of a second subterranean well comprise functions of a subterranean producing well;
wherein the single well comprises a single producing well;
wherein the second connector is operably coupled to the wellbore sensors within a bore of the well casing; and
wherein the first and the second connectors are configured to inductively couple to the lower umbilical.

17. A method as defined in claim 16, wherein the lower completion further comprises an acoustic assembly positioned within the well casing, the acoustic assembly comprising an acoustic receiver controller and the wellbore sensors, the method further comprising the step of:
positioning a kick over tool within the well casing below major portions of a lateral aperture in the well casing adjacent an opening into the lateral wellbore, the kick over tool including a recess housing the second connector, the second connector connected to a communication conduit connected to the acoustic receiver controller, the acoustic receiver controller connected to the wellbore sensors.

18. A method as defined in claim 16, wherein the wellbore sensors within the well casing comprise a plurality of acoustic sensors, the method further comprising the steps of:
positioning a first packer below an entranceway to the lateral wellbore and above the plurality of acoustic sensors to minimize noise associated with movement of fracturing fluid flowing through the lateral completion and encountered by the plurality of acoustic sensors; and
positioning a second packer below the plurality of acoustic sensors to hydraulically isolate the plurality of acoustic sensors to thereby prevent hydraulic incursions.

19. A method as defined in claim 16, wherein the formation associated with the producing well is fractured, wherein the wellbore sensors within the well casing comprise a plurality of acoustic sensors, and wherein the method further comprises the step of:
cementing the plurality of acoustic sensors in place to minimize noise encountered by the plurality of acoustic sensors.

20. A method of determining hydraulic fracture geometry in a reservoir by combining functions of a first subterranean well and functions of a second subterranean well into a single well, the method comprising the steps of:
running a lower completion comprising wellbore sensors positioned within a well casing, the wellbore sensors positioned within a formation layer of interest;
running a communication conduit defining a lower umbilical, the lower umbilical extending from a position outside a portion of the well casing containing the well sensors to a position adjacent an operable position of a connector;
drilling a lateral wellbore, the lateral wellbore oriented at least partially lateral to an orientation of the well casing and positioned at least substantially within the formation layer of interest to thereby provide fracturing within the formation layer of interest; and
running an upper completion with a communication conduit defining an upper umbilical, the upper umbilical attached to the connector, the connector operably coupled to the lower umbilical.

21. A method as defined in claim 20, wherein the step of running the lower completion and the step of running a communication conduit are performed simultaneously, the communication conduit and at least a portion of the well casing containing the wellbore sensors being connected and run together.

22. A method as defined in claim 20, wherein the functions of a first subterranean well comprise functions of a subterranean observation well, wherein the functions of a second subterranean well comprise functions of a subterranean producing well, and wherein the method further comprises the step of:
combining the functions of the first subterranean observation well and the functions second subterranean producing well into a single producing well.

23. A method as defined in claim 22, wherein the connector is a first connector connecting to the upper umbilical, and wherein the wellbore sensors are connected to at least portions of a second connector having at least portions positioned within a bore of the well casing.

24. A method as defined in claim 23, wherein the step of drilling the lateral wellbore comprises positioning an entranceway to the lateral wellbore at a location above the second connector and below the first connector.

25. A method as defined in claim 24, wherein the step of running the upper completion is performed prior to drilling the lateral wellbore.

26. A method as defined in claim 24, further comprising the step of:
running a lateral completion, the step of running the lateral completion comprising horizontally aligning the lateral completion at least substantially between upper and lower boundaries of the formation layer of interest to provide fracturing within the formation layer of interest.

27. A method as defined in claim 26, wherein the wellbore sensors are acoustic sensors, and wherein the step of running the lower completion comprises the step of:
positioning the portion of the well casing containing the acoustic sensors between upper and lower boundaries of the formation layer of interest.

28. A method as defined in claim 26, wherein a portion of the formation layer of interest is fractured above and below the lateral completion, wherein the wellbore sensors within the well casing comprise a plurality of acoustic sensors located within the formation layer of interest, and wherein the acoustic sensors receive fracturing data for portions of the formation layer of interest located above the lateral completion and receive fracturing data from portions of the formation layer of interest located below the lateral completion.

29. A method as defined in claim 26, wherein the wellbore sensors are acoustic sensors, the method further comprising the step of:
sensing an acoustic event by the plurality of acoustic sensors, the acoustic event resulting from hydraulic fracturing associated with the lateral completion.

30. A method as defined in claim 24, wherein the wellbore sensors are acoustic sensors, the method further comprising the step of:
sensing an acoustic event by the plurality of acoustic sensors, the acoustic event resulting from hydraulic fracturing associated with a lateral completion of an adjacent well.

31. A method as defined in claim 24, further comprising the step of:
positioning a packer below the entranceway to the lateral wellbore and above the plurality of acoustic sensors to minimize noise associated with movement of fracturing fluid through the lateral completion and encountered by the plurality of acoustic sensors.

32. A method as defined in claim 20,
wherein the connector is a first connector connecting to the upper umbilical;
wherein the wellbore sensors are attached to a second connector within the well casing; and
wherein the first and the second connectors are configured to inductively couple to the lower umbilical.

33. A method as defined in claim 32, wherein the first connector further comprises a wet connector coupled to the upper umbilical.

34. A method as defined in claim 32, wherein the second connector further comprises a wet connector coupled to the wellbore sensors.

35. A method as defined in claim 32, wherein the formation associated with the producing well is fractured, wherein the wellbore sensors within the well casing comprise a plurality of acoustic sensors, and wherein the method further comprises:
cementing the plurality of acoustic sensors in place within the well casing to minimize noise encountered by the plurality of acoustic sensors.

36. A method of determining hydraulic fracture geometry of a zone of interest in a reservoir, the method comprising the steps of:
providing a plurality of wells, each well comprising an upper completion, a lower completion, and a lateral completion extending into a lateral wellbore;
combining functions of a first subterranean well and functions of a second subterranean well into each separate one of the plurality of wells, by performing the following for each of the plurality of wells:
positioning a plurality of acoustic sensors in the lower completion, and
hydraulically isolating the plurality of acoustic sensors from fracturing fluid flowing through the upper completion and the lateral completion, the isolation provided via an isolation device positioned below the lateral wellbore and above the plurality of acoustic sensors to minimize noise associated with movement of the fracturing fluid through the lateral completion and encountered by the plurality of acoustic sensors; and
sensing an acoustic event resulting from hydraulic fracturing associated with the lateral completion of one of the plurality of wells, the sensing performed by one or more of the plurality of acoustic sensors in at least two of the plurality of wells.

37. A method as defined in claim 36, wherein the plurality of wells comprise a plurality of producing wells, wherein the functions of a first subterranean well comprise functions of a first subterranean observation well, and wherein the functions of a second subterranean well comprise functions of a subterranean producing well.

38. A method as defined in claim 36, wherein the isolation device comprises a packer.

39. A method as defined in claim 36, wherein the isolation device comprises cement.

40. A method of determining hydraulic fracture geometry of a zone of interest in a reservoir, the method comprising the steps of:
positioning an acoustic assembly within a first wellbore adjacent the zone of interest in a reservoir, the first wellbore drilled within a portion of the reservoir to receive a hydraulic fracturing treatment defining the zone of interest, the acoustic assembly including an acoustic receiver controller and a set of one or more acoustic sensors to capture fracture events within the zone of interest;
inserting a drilling deflector into the first wellbore;
drilling a second wellbore to receive a fracturing fluid;
positioning a communication conduit bypass within the first wellbore to extend from a first location above an interface with the second wellbore to a second location below the interface with the second wellbore;
inductively coupling the acoustic receiver controller to a first inductive coupler connected to a first end of the communication conduit bypass, the first inductive coupler positioned adjacent the second location below the lateral aperture;
inductively coupling surface equipment to a second inductive coupler connected to a second opposite end of the communication conduit bypass, the second inductive coupler positioned adjacent the first location above the lateral aperture; and
communicating real-time microseismic event data to a surface unit, the microseismic event data describing microseismic events detected by the acoustic assembly when performing hydraulic fracturing of the reservoir in the zone of interest through the second wellbore.

41. A method as defined in claim 40, further comprising the steps of:
isolating the set of one or more acoustic sensors from acoustic interference associated with delivery of fracturing fluid through a conduit string extending through portions of the first wellbore and into the second wellbore when performing the hydraulic fracturing of the reservoir in the zone of interest to thereby minimize noise encountered by the set of one or more acoustic sensors and associated with movement of fracturing fluid; and
detecting microseismic events associated with the performance of the hydraulic fracturing, the step of detecting including employing the set of one or more acoustic sensors.

42. A method as defined in claim 41, wherein the step of isolating the set of one or more acoustic sensors from acoustic interference includes the step of:
positioning a packer within a production liner containing the one or more acoustic sensors below major portions of the first wellbore containing the conduit string and above the set of one or more acoustic sensors to thereby minimize the noise encountered by the set of one or more acoustic sensors and associated with movement of the fracturing fluid.

43. A method as defined in claim 42, wherein the steps of inserting a drilling deflector and positioning an acoustic assembly within a first wellbore are performed simultaneously, the method further comprising the step of:
connecting the set of one or more acoustic sensors to a down-hole facing portion of the drilling deflector prior to performing the step of inserting the drilling defector into the first wellbore.

44. A method as defined in claim 40, wherein the step of positioning a communication conduit bypass within the first wellbore includes the steps of:
determining an expected location of the lateral aperture through a production liner;
connecting the second inductive coupler to an outer facing surface of the production liner at a location above the expected location of the lateral aperture;

connecting first inductive coupler to an outer facing surface of the production liner at a location below the expected location of the lateral aperture;

connecting an electrical conduit along an outer surface of the production liner between the first and the second inductive couplers away from the expected location of the lateral aperture; and running the production liner within the first wellbore.

45. A method as defined in claim 44, wherein the steps of inductively coupling the acoustic receiver controller to the first inductive coupler and inductively coupling surface equipment to the second inductive coupler comprises the steps of:

connecting a third inductive coupler to an outward facing surface of a portion of a tubing segment at a predetermined longitudinal distance from a reference point associated with a tubing locator extending from an outer surface portion of the tubing segment, the predetermined longitudinal distance coinciding with a longitudinal distance from the reference point to the second inductive coupler when the tubing locator is landed upon a portion of the production liner; and connecting a fourth inductive coupler to an outward facing surface of the drilling deflector at a predetermined longitudinal distance from a reference point associated therewith, the predetermined longitudinal distance coinciding with a longitudinal distance from the drilling deflector reference point to the first inductive coupler when the drilling deflector is landed at a preselected location within the production liner.

46. A method as defined in claim 40, wherein the second wellbore is devoid of any acoustic monitoring equipment and associated interfering communication conduits.

47. A method of determining hydraulic fracture geometry of a zone of interest in a reservoir, the method comprising the steps of:

positioning a kickover tool within a production liner in a first wellbore drilled within a portion of a reservoir to receive a hydraulic fracturing treatment defining a zone of interest;

positioning an acoustic assembly within the production liner in the first wellbore below major portions of the kickover tool and adjacent the zone of interest in the reservoir, the acoustic assembly including an acoustic receiver controller and a set of one or more acoustic sensors to capture fracture events within the zone of interest;

opening a lateral aperture in the production liner, the lateral aperture forming an entrance to a second wellbore to receive a fracturing fluid;

positioning a communication conduit bypass within the first wellbore to extend from a first location above the lateral aperture to a second location below the lateral aperture;

inductively coupling the acoustic receiver controller to a first inductive coupler connected to a first end of the communication conduit bypass, the first inductive coupler positioned adjacent the second location below the lateral aperture;

inductively coupling surface equipment to a second inductive coupler connected to a second opposite end of the communication conduit bypass, the second inductive coupler positioned adjacent the first location above the lateral aperture; and communicating real-time microseismic event data to a surface unit, the microseismic event data describing microseismic events detected by the acoustic assembly when performing hydraulic fracturing of the reservoir in the zone of interest.

48. A method as defined in claim 47, further comprising the steps of:

isolating the set of one or more acoustic sensors from acoustic interference associated with delivery of fracturing fluid through a conduit string extending through portions of the first wellbore and into the second wellbore when performing the hydraulic fracturing of the reservoir in the zone of interest to thereby minimize noise encountered by the set of one or more acoustic sensors and associated with movement of fracturing fluid; and detecting microseismic events associated with the performance of the hydraulic fracturing, the step of detecting including employing the set of acoustic sensors.

49. A method as defined in claim 48, wherein the step of isolating the set of one or more acoustic sensors from acoustic interference includes the step of:

positioning a packer within the production liner below major portions of the kickover tool and above the set of one or more acoustic sensors to thereby minimize the noise encountered by the set of one or more acoustic sensors and associated with movement of the fracturing fluid.

50. A method as defined in claim 47, wherein the steps of positioning a kickover tool within a production liner and positioning an acoustic assembly within the production liner are performed simultaneously, the method further comprising the step of:

connecting the set of one or more acoustic receivers to a down-hole facing portion of the kickover tool prior to performing the step of positioning the kickover tool in the production liner.

51. A method as defined in claim 47, wherein the step of positioning a communication conduit bypass within the first wellbore includes the steps of:

determining an expected location of the lateral aperture through the production liner;

connecting the second inductive coupler to an outer facing surface of the production liner at a location above the expected location of the lateral aperture;

connecting first inductive coupler to an outer facing surface of the production liner at a location below the expected location of the lateral aperture;

connecting an electrical conduit along an outer surface of the production liner between the first and the second inductive couplers away from the expected location of the lateral aperture; and running the production liner within the first wellbore.

52. A method as defined in claim 51, wherein the steps of inductively coupling the acoustic receiver controller to the first inductive coupler and inductively coupling surface equipment to the second inductive coupler comprises the steps of:

connecting a third inductive coupler to an outward facing surface of a portion of a tubing segment at a predetermined longitudinal distance from a reference point associated with a tubing locator extending from an outer surface portion of the tubing segment, the predetermined longitudinal distance coinciding with a longitudinal distance from the reference point to the second inductive coupler when the tubing locator is landed upon a portion of the production liner; and connecting a fourth inductive coupler to an outward facing surface of the kickover tool at a predetermined longitudinal distance from a reference point associated therewith, the predetermined longitudinal distance coinciding with a longitudinal distance from the kickover tool reference point to the first inductive coupler when the kickover tool is landed at a preselected location within the production liner.

* * * * *